United States Patent [19]

Seely

[11] 3,951,797

[45] Apr. 20, 1976

[54] PHOTOOXIDATIVE DESTRUCTION OF ORGANIC WASTES

[75] Inventor: Gilbert R. Seely, Fairborn, Ohio

[73] Assignee: Charles F. Kettering Foundation, Dayton, Ohio

[22] Filed: Feb. 21, 1975

[21] Appl. No.: 551,532

[52] U.S. Cl............................................. 210/63 R
[51] Int. Cl.$^2$......................................... C02B 1/34
[58] Field of Search .................. 210/63, 64, 59, 50, 210/54; 21/DIG. 2, 58; 204/157.1 R; 96/90 R

[56] References Cited
UNITED STATES PATENTS
3,544,322  12/1970  Yamada et al...................... 96/90 R FOREIGN PATENTS OR APPLICATIONS
2,158,714  6/1973  France

OTHER PUBLICATIONS

Sargent et al.; "Dye Catalyzed Oxidation of Refractory Organic Wastes Using Visible Light Energy;" A.I.Ch.E. 12/1974 (Symposium).

Primary Examiner—Charles N. Hart
Assistant Examiner—Benoit Castel
Attorney, Agent, or Firm—Biebel, French & Bugg

[57] ABSTRACT

A method for promoting the photooxidative destruction of organic waste pollutants by use of gelled metal alginate particles which have been stained with a dye sensitizer. The stained particles are both recoverable and biodegradable. They are effective in promoting the photooxidation of organic wastes including toxic phenol compounds in the presence of visible light and atmospheric oxygen.

9 Claims, No Drawings

PHOTOOXIDATIVE DESTRUCTION OF ORGANIC WASTES

BACKGROUND OF THE INVENTION

This invention relates to a method for promoting the photooxidative destruction of organic wastes and, more particularly, to a method utilizing particles of a biodegradable gelled metal alginate which have been stained with a sensitizing dye.

In recent years a justifiable concern has arisen over the presence in water supplies of organic waste pollutants. Among the more toxic constituents of effluents are phenols, cresols, xylenols, polyphenols, etc., which are introduced into the environment from chemical, petrochemical and plastics industries, refineries and coke ovens, and even from decaying vegetation. In a recent report to the United Nations Food and Agriculture Organization (*Water Res.*, 7, 929–41 (1973)), the limit on combined phenols was recommended to be 1 ppm to ensure survival of salmonoids and 2 ppm for coarse fish.

The problem is compounded when water is treated with chlorine for municipal use. Chlorine reacts with phenols in the ppm range to produce o- and p-chlorophenols up to 2,4,6-trichlorophenol. Because of the off-taste and the odor arising from p-chlorophenol in water, the U.S. Public Health Service (1962) suggested a limit of 0.001 ppm of phenol in drinking water. This is lower than that for cyanide and arsenic. Toxicity of these phenols to fish is also greater than that of the unchlorinated phenols.

An outline of these problems and some of the current solutions is given in J. E. Zajic, "Water Pollution, Disposal and Reuse", Vol. 2, pp. 418–426 (1971). There, Zajic reports that the following treatments for phenolic wastes may be used: (1) solvent extraction, (2) steam stripping, (3) adsorption, (4) ion exchange, (5) chemical degradation and (6) biological degradation.

If the phenol concentration is high enough, recovery by solvent extraction or steam stripping may be economically feasible. However, phenol concentrations in most industrial effluents are not sufficiently high to justify such procedures. For this reason, phenols in dilute industrial effluents are usually adsorbed on activated carbon, from which they may be recovered. On the other hand, Zajic lists several limitations to this method, viz: lack of continuity in the process and contamination of the activated carbon by tars and tar acids beyond regeneration.

Similarly, because of their toxicity to most microorganisms, biodegradation of phenols is slow; however, the products are non-toxic, and this is a feasible method of treatment if the concentration is not too high. Chemical oxidation by ozone, chlorine or potassium permanganate is the fastest degradative treatment, but the cost in power and chemicals is high. In addition, as Zajic notes, with elemental chlorine precaution must be taken to ensure complete reaction of the phenol or the partially chlorinated phenol derivatives impart objectionable taste and toxicity to the water.

For these reasons, photooxidation has been studied as a possible solution to the problem. It is attractive because instead of requiring stoichiometric quantities of electrically or electronically produced oxidants, such as chlorine or ozone, the reaction takes place in the presence of sunlight, air and catalytic quantities of a promoter. Zinc titanate, zinc oxide, titanium dioxide and beach sand have been found to promote photocatalytic oxidation of dissolved organic matter on irradiation with sunlamps. See Kinney et al., "Photolysis Mechanisms for Pollution Abatement", Report No. TWRC-13, U.S. Dept. of Interior, Federal Water Pollution Control Adm., Ohio Basin Region, Cincinnati, Ohio, October 1969.

Dye sensitizers have also been used. Thus, Sargent and Sanks in a recent presentation at the Photochemical Reaction Engineering Symposium of the American Institute of Chemical Engineers in Washington, D.C., Dec. 1–5, 1974, entitled "Dye Catalyzed Oxidation of Refractory Organic Wastes Using Visible Light Energy" explained that the reaction sequence for dye sensitization involves absorption of light energy by the dye, transfer of dye energy to dissolved oxygen to form energized oxygen, and oxidation of the organic waste by the energized oxygen.

Accordingly, Sargent and Sanks describe the use of dyes in a homogeneous solution to promote aerobic photooxidation of organic wastes. While this system suffers from the instability of the dye in the homogeneous phase and the need to stain large volumes of water effectively, Sargent and Sanks find it preferable to the resin-bound dyes which they also tested since binding to ion exchange resins was found to reduce the effectiveness of the dye as a sensitizer and slow down the reaction as compared to dissolved dyes.

Still, it would be desirable for the sensitizing dye to be bound to a particulate material since treatment with homogeneous phase dyes results in an intermixing of the dye and the water treated which may be objectionable; whereas, with stained solid particles the phases remain separate. Similarly, use of heterogeneous phase dye-stained particles permits easy recovery of the stained particles by sedimentation or screening, allowing for reclaiming, restoring or reusing. It would also be particularly desirable if a biodegradable base material could be used since this would allow for distribution of the stained particles in polluted lakes and ponds in a one-time application without any detrimental environmental effect.

In regard to resin-bound dye sensitizers, it is noted that Blossey, Neckers, Thayer and Schaap in an article entitled "Polymer-Base Sensitizers for Photooxidants" in the *Journal of the American Chemical Society*, 95:5820 (1973) report on the use of a Rose Bengal polymer-based reagent to sensitize the generation of singlet molecular oxygen for promoting photochemical reactions. The base used was an insoluble styrene-divinylbenzene copolymer bead. This material, however, is not biodegradable and would be difficult to regenerate.

Accordingly, the need still exists for an effective polymer-based dye sensitizer for promoting photooxidative destruction of organic waste, especially a material which would be biodegradable while at the same time stabilizing the dyes to prolong their useful life over that which they evidence in homogeneous phase systems.

SUMMARY OF THE INVENTION

The present invention fills this need by providing a feasible method of promoting photooxidation of organic waste materials, including phenolic compounds. The method involves the use of gelled metal alginate particles. The particles are stained with an appropriate sensitizing dye which will photocatalytically generate singlet oxygen in the presence of sunlight or artificial light for effective destruction of the oxidizable pollutants contained in the organic wastes.

It is known that most organic waste molecules are not destroyed by direct absorption of visible light, but that when oxygen is excited to a singlet state, it becomes a strong oxidizing agent capable of oxidizing many ordinarily refractory organic compounds. It is also known that various dyes sensitize or catalyze in situ the generation of singlet oxygen. The present invention utilizes those known principles in providing a means to effectively oxidize polluting organic compounds.

In addition to providing the known sensitizing function of homogeneous dye systems, however, the dyestained alginate particles present a heterogeneous phase which has a number of advantageous features. Most significantly, there is no need to separate the dye from the water treated as occurs when a homogeneous dye system is used. In addition, the particles do not, as a rule, introduce a new toxic material into the environment they are intended to treat since alginate is known to be both non-toxic and biodegradable (in fact it is a common bulk additive to food products). Likewise, the dyes used are not notably toxic, and are slowly degraded under conditions of use.

Unlike ion exchange resin particles, alginate particles stabilize the dyes in an active state and prolong their useful life over that which they evidence in homogeneous phase systems. The gelled particles are mechanically and chemically resistant to deterioration under contemplated conditions of use and may, thus, be reclaimed, restrained, and reused several times without serious loss of efficiency.

These properties make it possible to treat industrial effluents containing organic wastes, such as phenols at concentrations below that for economical recovery, in sunlit lagoons, riffle beds, or in batch or continuous column reactors. It is also possible to use the stained alginate particles for broadcast application of the particles in lakes, rivers or estuaries where a pollution problem exists. In the latter application, the particles would require no further attention or recovery since they are degraded naturally to harmless derivatives in a reasonable time.

The particulate base consists of a soluble alginate (such as sodium, potassium or ammonium alginate); gelled by treatment with divalent or trivalent metal ions. As an alternative means of obtaining a particular metal ion gelled alginate, an ion-exchange process can be used to replace the ions in already gelled particles with different metal ions of the particular type desired. In either event, a gelled metal alginate is formed having metal ions available to act as binding agents for the dye. Barium, calcium, strontium and aluminum alginates are preferred, but alginates of lead, iron, copper and other divalent metal ions can be used if desired.

The particles are stained by immersion in a solution containing a suitable sensitizing dye which will bind to the alginate particles. Most of the dye may be incorporated into the gelled alginate particle within a few minutes, but it takes about a day for it to be distributed evenly throughout. For the most part cationic dyes which have marked aggregating or metachromatic properties are used. Examples of the types of dyes possible include the acridine, thiazine, triphenylmethane, phenazine and phthalocyanine classes, with the thiazine dyes being preferred. It is believed that much of the dye in the particle is in an aggregated, photochemically inactive form, but is in equilibrium with the monomeric, photochemically active form. In any case, the stability of the dyes against chemical and photochemical degradation is markedly increased by binding to the gelled alginate particles. The amount of dye bound to the particles can vary all the way to a 1:1 ratio, depending on the economic considerations, but generally the preferred alginate normality ratios are in the range of 1:30 – 200.

The dye is usually destroyed or much depleted by an exhaustive photosensitized oxidation reaction. Also the dye is sometimes removed from the alginate particle by complexing with oxidation products of the organic waste, but this dye is still photoactive and may continue photosensitizing the reaction in the homogeneous phase.

It is known that dye sensitized photooxidation of phenols increases with pH at least to pH 10. Thus, with phenols it is necessary to have a medium which is at least weakly alkaline (pH $\simeq$ 9) to get photooxidation because only the phenolate ion is attacked. Since the gelled alginate particles are neutral, it is thus necessary to add alkali to the solution if oxidation is to be favored. Furthermore, if the products of the reaction are acidic, the medium must be neutralized if the reaction is to be maintained.

One approach to this problem is to simply add to the effluent to be treated (if it is not already alkaline) a basic material which will adjust the pH upward and permit the reaction to go forward. However, in the case of lagoons or natural waters, this may not be feasible. Therefore, another possible approach is to establish basic conditions within the gelled alginate particle itself. This obviates the need to add alkali to the entire medium. It may be done by milling slightly soluble basic substances into the alginate solution before gelling. Any compatible alkaline filler having a proper solubility and basic reaction on hydrolysis may be used. Examples ae magnesium oxide, magnesium carbonate, calcium carbonate, strontium carbonate, barium carbonate, and mixtures thereof. Thus, it is possible to oxidize phenols without addition of alkali to the medium, and in some cases, without the medium becoming alkaline at all. In addition, it has been found that the presence of the basic filler inside the particle accelerates the net diffusion of phenol into the bead, thus further promoting the oxidation.

In this manner, using either a filled or unfilled gelled metal alginate particle which has been stained with a sensitizing dye, it is possible to effectively promote the photooxidation of organic wastes including aromatics like cresol and phenol. This may be done in a batch or a contiuous process in the presence of sunlight or other visible light and in the presence of air or any other oxygen source.

Accordingly, it is an object of the present invention to provide an effective method of promoting photooxidative destruction of organic wastes using dye-stained, gelled, metal alginate particles.

It is another object of the present invention to provide dye-stained, gelled, metal alginate particles containing a basic filler which particles may be used to provide an alkaline condition favorable to the oxidation.

Other objects and advantages of the present invention will be apparent from the following description and the appended claims.

DESCRIPTION OF THE PREFERRED EMBODIMENTS

The present invention for promoting photooxidative destruction of organic wastes was tested primarily for its effectiveness in oxidation of phenols because of their outstanding environmental impact. Photochemical oxidation does not oxidize phenols completely to carbon dioxide and water, but does destroy the aromatic ring system which is primarily responsible for toxicity. The products that do form are probably susceptible to further photooxidation, hydrolysis and biodegradation. Therefore, it is possible that photooxidation could be used as a step preliminary to biodegradation in the usual manner, whereby the toxicity of phenols to microorganisms is obviated.

Although the photosensitized oxidation of phenols by dye sensitizers is generally considered to proceed by a mechanism involving singlet oxygen generation, other mechanisms are known for photosensitized oxidation in general, and these may occur instead of, or in addition to, the singlet oxygen mechanisms. Any oxidation which is promoted by dye sensitization, whether through production of singlet oxygen or otherwise is a possible reaction to be promoted by the stained alginate particles of the present invention. Thus, dye sensitizers can also be used to promote the photooxidation of aliphatic amines, mercaptans, olefins, and certain heterocyclic compounds, any of which may be present as pollutants in industrial effluents. The use of these dye sensitizers bound to the particulate alginate material as in the present invention is often desirable in such photosenstized oxidation reaction, and thus, it is possible to use the disclosed process for the treatment of numerous types of waste effluents in addition to phenolic wastes.

A dye which promotes photochemical oxidation without being consumed by the reaction is considered a sensitizer. Its activity may be through a mechanism in which the dye adsorbs visible light energy, transfers it to another compound such as dissolved oxygen, thereby returning to ground state to adsorb more light, or one involving the transfer of electrons. In the present invention, the dyes that stain the gelled alginate particles deeply and are retained well are those with marked aggregating or metachromatic properties. Cationic dyes without these properties adsorb to the bead by ion exchange but easily wash out. Fortunately most of the strongly photosensitizing dyes happen to fall into the former category.

Staining has been carried out with dyes of the acridine, thiazine, triphenylmethane, phenazine and phthalocyanine classes of dyes, although the thiazine dyes are preferred since they are often the strongest sensitizers. Aluminum alginate particles bind dyes like thionine normally, but also bind dyes of classes that are known to be ligands for the $Al^{+3}$ ion. These classes include the alizarins and hypericin.

Usually the dyes in an aqueous solution form are used to stain the gelled alginate particles. Any concentration of dye may be used, but those in the $10^{-4}$ to $10^{-3}$M range are preferred. Likewise, the amount of dye bound to the particles may vary greatly, but generaly the dye to alginate normality ratios used ranged from 1:30 to 1:200. Dyes which are not soluble in water may be applied from an organic solvent solution and then the stained particles transferred to water. For example, the dye chloroaluminum chlorophthalocyanine was put on gelled barium alginate beads in methanol solution and the beads then placed in water.

The gelled alginate particles may be prepared by adding a solution of an alginate (such as sodium alginate) dropwise to a solution of a divalent or trivalent metal salt (such as 0.03 M $Ba(NO_3)_2$, 0.1M $CaCl_2$ or 0.1M $Sr(OOCCH_3)_2$) under gentle stirring. The concentration of alginate solution is not critical to the size of the particle formed, but does affect somewhat its mechanical strength and capacity for stain. Gelled particles have been made with from $7.5 \times 10^{-3}$ N (1.5 g/l) alginate solution to $4.2 \times 10^{-2}$ N (8.5g/l) alginate solution, that is up to a 1% solution. Mechanical consistency of the bead sets the lower limit on concentration of alginate solution; viscosity sets the upper.

As each drop of alginate solution contacts the metal salt solution, a pellicle of gel forms. It then becomes uniformly gelled as the ions permeate it. The drop shrinks to about one-third of its original volume and becomes a weakly elastic, soft, easily cut, transparent particle or bead. Although the beads are deformable, they do not crumble under normal careful handling.

In addition to the barium, calcium and strontium salt gelling solutions mentioned, lead, iron and copper ones have been used in a like manner to gell sodium alginate drops. At least $10^{-3}$ molar solutions are used, with the saturation point being the upper concentration limit.

As mentioned, an alternative means of obtaining a particular metal alginate is to use an ion-exchange process on already gelled alginate particles. Thus, aluminum alginate beads have been made successfully by treating calcium alginate beads with alum solutions.

Beads are separated from supernatant by decantation or draining through a Buchner funnel. They shrink through syneresis if left out of water very long, and so must be kept immersed. Similarly, they are not stable in strongly alkaline solution because of hydrolysis, or in solutions containing acids, monovalent salts at high concentration, or certain chelating agents because of displacement of the divalent metal binding the gel. If such conditions are encountered in application, chemical modification of the beads to withstand these conditions should be used.

As mentioned, one method of creating a weakly alkaline condition, which favors photooxidation of phenols, is by use of basic fillers within the gelled alginate particles themselves. This is easily accomplished by milling the basic materials, such as $MgO$, $MgCO_3$, $CaCO_3$, $SrCO_3$, $BaCO_3$ or mixtures, into the alginate solution before forming the gelled particles. While various amounts may be used, the preferred ratio of salt addition is 1 g per 25 ml of alginate solution.

A number of examples follow which illustrate the use of stained alginate gel particles in the photosensitized oxidation of typical pollutant phenols. Most of these reactions were run in the laboratory in a batch-type reactor, with artificial (tungsten) lighting, and with oxygen introduced into the system. Reactions have also been followed in open vessels, exposed to the atmosphere and sunlight. Because of the greater intensity of sunlight, these reactions appeared generally to go more rapidly and thoroughly than the former.

Some degree of photosensitized oxidation has been observed with most of the dyes used of the classes mentioned, but the most effective dyes readily available were found to be those of the thiazine class, including Methylene Blue, Thionine, and Toluidine Blue. One of the more effective filled bead systems, barium alginate plus barium carbonate, was used routinely with Toluidine Blue to compare the behavior of different phenols.

EXAMPLE I

Strontium alginate gel beads were prepared by adding 25 ml of $8.6 \times 10^{-3}$ N sodium alginate (Manugel, Alginate Industries Ltd.) dropwise to 500 ml of 0.1 M strontium acetate solution. The beads were drained, treated with 50 ml of $2 \times 10^{-4}$ M strontium acetate, and with distilled water. They were then stained with $5.5 \times 10^{-6}$ moles of Toluidine Blue, so that the ratio of alginate uronic acid residues to dye molecules was 39.

These beads were added in a round bottom flask to 800 ml of a solution containing $1.025 \times 10^{-3}$ M phenol and 10 ml of saturated strontium hydroxide solution, and irradiated with a 750 watt projector lamp 22 cm from the reaction flask. The flask was kept at approximately 23°C by a water bath, and a slow stream of oxygen was fed into it. The contents were stirred magnetically to keep the beads circulating through the solution.

Irradiation was continued for 23 hours during which time 13 ml more saturated strontium hydroxide was added to maintain the phenol in an ionized state. The light intensity measured in back of the reactor was $1.25 \times 10^5$ erg/cm$^2$sec.

The solution soon turned olive-brown, and the absorption spectrum correspondingly showed continuously increasing intensity throughout the visible and ultraviolet regions, belonging to oxidation products of phenol. The lack of characteristic bands in the spectrum of these products indicated that the aromatic ring system of phenol was being destroyed. Analysis of the ultraviolet spectrum showed that about 50% of the phenol had been oxidized in 23 hours.

Chemical oxygen demand (COD) measurements were made with a Precision AquaRator. These showed a reduction from 236 ppm at the beginning to 148 ppm at the time the reaction was stopped.

EXAMPLE II

Barium alginate gel beads containing magnesium carbonate were prepared by adding 25 ml of a 1% solution of sodium alginate (sample obtained from Kelco Co.), combined with 1 g of freshly precipitated magnesium carbonate, dropwise into 500 ml of 0.05 M barium nitrate solution. On standing in wash water, the beads began to swell because of replacement of barium in the gel crosslinks by magnesium, but this was suppressed by transferring the beads to $10^{-3}$ M barium chloride solution.

The beads were washed twice and stained with $5 \times 10^{-6}$ moles of Toluidine Blue. The ratio of polyuronic acid equivalents of moles of dye was 215.

The stained beads were added in a round bottom flask to 800 ml of $1.15 \times 10^{-3}$ M guaiacol, without addition of external base, and the reaction conducted for 23 hours as in Example I.

Under irradiation, the solution darkened rapidly, with steadily rising absorption in the visible and ultraviolet regions. Analysis of the ultraviolet spectrum showed that the bands of guaiacol were essentially gone after four hours, being replaced by the broader band of a nonaromatic product. This band too was gone after 23 hours, leaving only continuous absorption. Meanwhile, the beads were bleached, though some dye was detectable in solution.

The COD fell from 310 ppm at the beginning of the reaction to 138 ppm at the end. After the reaction, alum was added to the solution, whereupon a brown precipitate separated and the COD of the supernatant fell to 90 ppm.

EXAMPLE III

Calcium alginate gel beads containing dolomite were prepared by adding 25 ml of 1% sodium alginate (Kelco sample) solution, mixed with 0.9 g dolomite (ca. $2CaCO_3 \cdot MgCO_3$), dropwise to 150 ml of 0.1 M calcium chloride solution. These beads were used in two reactions, recovered each time, and restained a third time with $5 \times 10^{-6}$ moles of Toluidine Blue. The beads were added in a round bottom flask to 800 ml of solution, $1.015 \times 10^{-3}$ M in p-cresol, and irradiated as before for a total of 47 hours.

The reaction proceeded without marked discoloration of the contents of the flask, but there was a strong increase of absorption in the shorter ultraviolet. Cresol was destroyed at the rate of about 6% of the remaining cresol per hour. After 47 hours, there was estimated to be no more than about 6% of the original cresol left. On a weight basis, this amounts to a drop from 112 ppm to 6.6 ppm cresol.

Although this reaction went somewhat slower than when barium or magnesium carbonate is used as a basic filler, the pH of the solution did not become alkaline at any time, as evident from the appearance of the spectrum of cresol. The buildup of visible-absorbing oxidation products was markedly less than in other runs.

EXAMPLE IV

Filled and stained barium alginate gel beads were prepared from 25 ml of 1% sodium alginate solution (Kelco sample), 1/3 g of barium carbonate, and $5 \times 10^{-6}$ moles of Toluidine Blue, as in previous examples. These beads were used in a round bottom flask to oxidize 0.0514 g of p-chlorophenol in 800 ml of water ($5 \times 10^{-4}$ M). Irradiation was continued for 95 hours.

Absorption due to products rose continually through the visible spectral region and the ultraviolet above 290 nm. Below that wavelength, background absorption decreased after 3 days. Absorption bands of a definite product appeared around 250 nm, maximized after about 7 hours irradiation, and had vanished at the end of the reaction. In contrast, bands in the region characteristic of p-chlorophenol persisted until the end of the reaction, in an amount about 22% of the original chlorophenol absorption.

Analysis of the final solutions with 3-methyl-2-benzothiazolinone hydrazone indicated the presence of a phenol, but apparently not p-chlorophenol. It is possible that a product of the reaction is a phenol which is refractory to further oxidation, perhaps because of a high acid dissociation constant.

The COD fell from 112 ppm at the beginning to 42 ppm at the end, and addition of alum did not decrease it further.

Titration of chloride showed that 73% of that originally in chlorophenol had been released in inorganic form by the oxidation.

In oxidation of more dilute p-chlorophenol solutions ($10^{-4}$M), destruction of 95% of the starting material could be obtained. In an oxidation of $2 \times 10^{-4}$M 2,4-dichlorophenol sensitized by thionine, 94% loss of the phenol was reached after 24 hours.

EXAMPLE V

Strontium alginate gel beads, made from 25 ml of sodium alginate solution, $7.5 \times 10^{-3}$ N, and containing 0.73 g of strontium carbonate, were stained with $5 \times 10^{-6}$ moles of Toluidine Blue. These were added in a round bottom flask to 800 ml of a solution saturated in pentachlorophenol ($10^{-4}$ M), and oxidation sensitized as usual.

The pentachlorophenol appeared entirely gone after four hours, its place being taken by a product absorbing at somewhat shorter wavelengths. This product, too, was nearly gone after 6 hours, and after 23 hours only broad bands of products in the shorter ultraviolet remained. There was thus evidently complete oxidation of pentachlorophenol to non-aromatic products in that time.

2,4, 6-trichlorophenol and 2, 3, 4, 6-tetrachlorophenol were oxidized in a manner similar to this.

EXAMPLE VI

Barium alginate gel beads were made by dropping 85 ml of a 1% sodium alginate solution into 500 ml of 0.04 M barium nitrate solution, and allowed to stand until they had shrunk to constant volume which is from one-fourth to one-third of the original volume of alginate solution. The beads were then poured into a glass column 48 cm long by 1.2 cm diameter. The column contained $3.6 \times 10^{-3}$ equivalents of uronate residues.

The column of beads was stained by drawing $10^{-3}$ M thionine solution into it, until $3.6 \times 10^{-5}$ moles of dye had been attached to the beads, giving a polymer equivalent-to-dye ratio of 100. The dye was taken up very rapidly, and the beads appeared purplish-black.

The column was held in an enclosure with three 15-watt fluorescent lamps parallel to it. Inside walls of the enclosure were painted white for better reflection of light.

Water was poured through the column until the concentration of dye in the effluent fell to $1 \times 10^{-6}$ M. The color of dye in water in equilibrium with the beads was barely discernible.

A solution, $1 \times 10^{-4}$ M in phenol and $2 \times 10^{-4}$ M in tetraethylammonium hydroxide (pH 8.9), and saturated with oxygen (ca. $1.25 \times 10^{-3}$ M), was then introduced into the column. When the concentration of phenol in the effluent reached its maximum value, the light was turned on. The phenol solution was passed through the column at different flow rates, and the ultraviolet spectrum of the effluent recorded at frequent intervals.

At a flow rate of 60 ml/hour, phenol was not detectable in the spectrum of the effluent, the dominant product being one with an absorption band at 245 nm. At faster flow rates, phenol appeared in the effluent, but at slower flow rates to 30 ml/hour, the 245 nm product was itself almost eliminated, leaving generally rising absorption through the ultraviolet in indistinct bands. A total of 1 liter of phenol solution was passed through the column.

After this, 1 liter of $10^{-4}$ M p-cresol, and 1 liter of $10^{-4}$ M p-chlorophenol, were passed similarly through the column, with similar results overall. During this time, the dye was not leached from the beads to such an extent that replenishment was necessary.

Higher concentrations of phenols were not used because of the limited solubility of oxygen in water. Under these conditions, formation of products with absorption in the visible region was not evident.

Unfilled gelled alginate particles are better for such column applications as found in Example VI above and in other situations where the volume created is restricted. They keep the dye better and dissolution of the filler would not limit their useful life. Therefore alkali material such as lime water is also metered into the column while processing the organic waste.

Filled particles are generally preferred for broadcast application and situations where ponds, lagoons or natural waters are treated since it is not feasible to add alkali materials under those conditions. Of course, if the waters to be treated are naturally alkaline, unfilled gelled alginate particles could be used. In the application to ponds, lagoons, etc., it is contemplated that this can be a one-time application with the stained gelled alginate particles biodegrading rather than being recovered.

From the foregoing examples, it can be seen that the dye-stained, gelled alginate particles of the present invention are useful in promoting the photooxidation of various phenols found in waste effluents. They are also useful in promoting the photooxidative destruction of other organic wastes found in aqueous effluents. Similarly, it is believed apparent to one of ordinary skill in the art that the same particles could be used to prepare a desired oxidation product of an organic or inorganic compound, if that desired product can be prepared by photosensitized oxidation. By this means then, industrial chemicals could be commercially synthesized and produced in the same manner that industrial waste effluents can be photooxidatively destroyed.

While the method herein described constitutes a preferred embodiment of the invention, it is to be understood that the invention is not limited to this precise method, and that changes may be made therein without departing from the scope of the invention.

What is claimed is:

1. A method for photooxidative destruction of organic wastes found in aqueous effluents utilizing a dye sensitizer to promote the oxidation of said organic wastes by air or oxygen in the presence of visible light, at an at least weakly alkaline pH and under other process conditions operable to effect the photooxidation wherein the improvement comprises using as the promoter biodegradable, gelled metal alginate particles selected from the group consisting of barium alginate, calcium alginate, strontium alginate, and aluminum alginate beads which have been stained with a dye sensitizer selected from the group consisting of the acridine, thiazine, triphenylmethane, phenazine, phthalocyanine classes of cationic dyes, the dye to alginate normality ratio being in the range of 1:30 to 1:200.

2. The method of claim 1 wherein said beads are prepared by adding a solution of sodium alginate dropwise to a solution of divalent metal salt selected from the group consisting of barium, calcium and strontium salts under gentle stirring to form a gelled bead.

3. The method of claim 1 wherein said beads are prepared by treating calcium alginate beads with alum solution.

4. The method of claim 1 wherein thiazine dyes are used.

5. The method of claim 1 wherein said organic wastes include phenolic compounds.

6. The method of claim 5 wherein said alginate particles are gelled beads selected from the group consisting of barium alginate, calcium alginate, strontium alginate and aluminum alginate beads and said sensitizing dye is a thiazine dye.

7. The method of claim 5 wherein said alginate particles contain an alkaline salt filler material to provide at least a portion of said alkaline conditions.

8. The method of claim 7 wherein said filler is selected from the group consisting of magnesium oxide, magnesium carbonate, calcium carbonate, strontium carbonate, barium carbonate and mixtures thereof.

9. The method of claim 8 wherein said alginate particles are barium alginate beads, said filler is barium carbonate and said dye is Toluidine Blue.

* * * * *